US010740862B1

(12) United States Patent
Cui et al.

(10) Patent No.: US 10,740,862 B1
(45) Date of Patent: Aug. 11, 2020

(54) SYSTEMS AND METHODS FOR EFFICIENT BOX PACKING AND VISUALIZATION

(71) Applicant: Coupang, Corp., Seoul (KR)

(72) Inventors: Xiaohua Cui, Shanghai (CN); Rubin Zhao, Shanghai (CN)

(73) Assignee: Coupang, Corp., Seoul (KR)

( * ) Notice: Subject to any disclaimer, the term of this patent is extended or adjusted under 35 U.S.C. 154(b) by 0 days.

(21) Appl. No.: 16/580,069

(22) Filed: Sep. 24, 2019

(51) Int. Cl.
*G06Q 50/28* (2012.01)
*G06F 30/20* (2020.01)

(52) U.S. Cl.
CPC .............. *G06Q 50/28* (2013.01); *G06F 30/20* (2020.01)

(58) Field of Classification Search
CPC ............. G06Q 10/087; G06Q 10/0832; G06Q 30/0643; G06F 17/5009; G06F 2217/38
See application file for complete search history.

(56) References Cited

U.S. PATENT DOCUMENTS

| 6,876,958 B1* | 4/2005 | Chowdhury | ........... G06Q 10/04 414/801 |
| 2018/0374046 A1* | 12/2018 | Powers | ............ G06Q 10/08345 |

* cited by examiner

*Primary Examiner* — Rehana Perveen
*Assistant Examiner* — Steven W Crabb
(74) *Attorney, Agent, or Firm* — Finnegan, Henderson, Farabow, Garrett & Dunner, LLP

(57) ABSTRACT

Systems and methods are provided for efficient box packing and visualization. One method comprises receiving, from a remote system, an order comprising at least one item; searching at least one data store to determine dimensions associated with the at least one item; and modifying dimensions of at least one largest item of the order using a factor. The method may further comprise selecting a data structure representing a first package, the data structure comprising a size of the first package; iteratively simulating packing the items into the first package based on the modified dimensions, until all items are packed in the selected package; and generating at least one set of instructions for packing the items into the selected package. The method may further comprise sending the generated instructions to a second system for display, the instructions including at least one item identifier and one package identifier.

20 Claims, 13 Drawing Sheets

SYSTEMS AND METHODS FOR EFFICIENT BOX PACKING AND VISUALIZATION

TECHNICAL FIELD

The present disclosure generally relates to computerized systems and methods for efficient box packing and visualization. In particular, embodiments of the present disclosure relate to inventive and unconventional systems for automatically determining a packing sequence and layout based on the items to be packed and the fragileness of those items.

BACKGROUND

Consumers often purchase multiple products online in a single order for delivery. Due to the fragileness of some items and cost constraints, special packing arrangements may be required for a consumer's order. For example, some items may be fragile and require packing bubbles for protection during transit. Additionally, some consumers may prefer to save on costs by having fewer boxes used in their delivery.

Existing computerized methods for packing, however, are inefficient. They rely on rough estimates that do not account for packing more fragile items. For example, existing methods for packing do not incorporate room for packing bubble when providing rough estimates of the packing arrangement. Additionally, existing computerized methods do not provide visualizations of the optimal placement of items in a box, inefficiently leaving the choice up to the packer. These inefficiencies in packing may result in costly orders for consumers (e.g., due to more boxes being used for delivery than are necessary).

Therefore, there is a need for improved methods and systems for computerized systems and methods for efficient box packing and visualization.

SUMMARY

One aspect of the present disclosure is directed to a computerized system for automatic packing determination. The system may comprise at least one processor; and at least one non transitory storage medium comprising instructions that, when executed by the at least one processor, cause the at least one processor to perform steps. The steps may comprise receiving, from a remote system, an order comprising at least one item; searching at least one data store to determine dimensions associated with the at least one item; and modifying dimensions of at least one largest item of the order using a factor. The steps may further comprise selecting a data structure representing a first package, the data structure comprising a size of the first package; iteratively simulating packing the items into the first package based on the modified dimensions, until all items are packed in the selected package; and generating at least one set of instructions for packing the items into the selected package. The steps may further comprise sending the generated instructions to a second system for display, the instructions including at least one item identifier and one package identifier.

Yet another aspect of the present disclosure is directed to a method for generating packing instructions. The method may comprise receiving, from a remote system, an order comprising at least one item; searching at least one data store to determine dimensions associated with the at least one item; and modifying dimensions of at least one largest item of the order using a factor. The method may further comprise selecting a data structure representing a first package, the data structure comprising a size of the first package; iteratively simulating packing the items into the first package based on the modified dimensions, until all items are packed in the selected package; and generating at least one set of instructions for packing the items into the selected package. The method may further comprise sending the generated instructions to a second system for display, the instructions including at least one item identifier and one package identifier.

Yet another aspect of the present disclosure is directed to computerized system for automatic packing determination. The system may comprise at least one processor; and at least one non transitory storage medium comprising instructions that, when executed by the at least one processor, cause the at least one processor to perform steps. The steps may comprise receiving, from a remote system, an order comprising at least one item; searching at least one data store to determine dimensions associated with the at least one item; and modifying dimensions of at least one largest item of the order using a factor. The steps may further comprise selecting a data structure representing a first package, the data structure comprising a size of the first package; iteratively simulating packing the items into the first package based on the modified dimensions, until all items are packed in the selected package; and generating at least one set of instructions for packing the items into the selected package. The steps may further comprise sending the generated instructions to a second system for display, the instructions including at least one item identifier and one package identifier; wherein the generated instructions include instructions for placement of each item to be packed and an order of placement for each item to be packed; and a computer-generated image depicting each item to be packed.

Other systems, methods, and computer-readable media are also discussed herein.

DETAILED DESCRIPTION

Figure 1A:
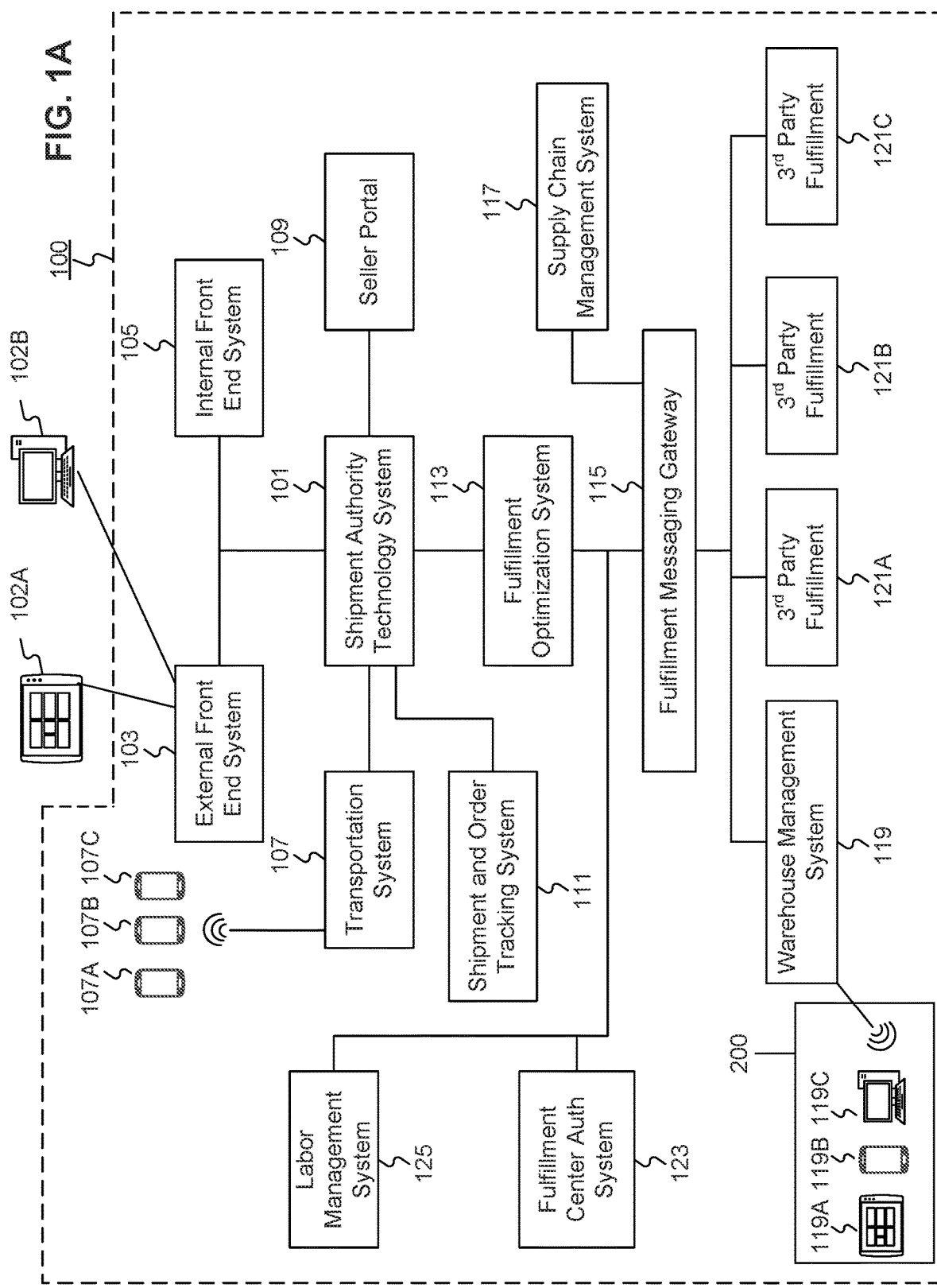
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for efficient box packing and visualization. The disclosed embodiments are advantageously capable of generating instructions and visualizations of those instructions using product information of items in an order placed by a customer and package information for packing boxes. Product information associated with the items and package information for packing boxes may be retrieved from one or more databases. For example, product information may include dimensions such as length, height, width, volume, weight, product identifier, or fragileness of the associated item. Package information for packing boxes may dimensions such as length, height, width, volume, weight, or package identifier of the packing box.

In one implementation, a packing system may determine the largest item of each order based on the determined dimensions retrieved from a database. For example, the largest item may be determined by sorting the items by longest length or by largest volume. The fragileness of an item may be indicated by a "normal" tag or a "fragile" tag, which is used to modify the volume of the largest item such that packing bubble may be accounted for in determining the most efficient box packing. The packing system may generate instructions of the most efficient box packing by iteratively calculating the remaining spaces within the package and determining the best arrangement of each item based on the item's size. The generated instructions may use a customer's selection of one of a smaller number of packages used for delivery, lower cost, or higher fill rate in generating the instructions.

In some embodiments, the packing system may send the generated instructions to a visualization system via a network. The visualization system may display the most efficient box packing arrangements according to the instructions received from the packing system. For example, the visualization system may simultaneously display the text of the received instructions and an animated tutorial on how to package the items according to the instructions. The animated tutorial may comprise computer-generated images of the package and each item to be packed, including rotations and placement of the items into the package.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
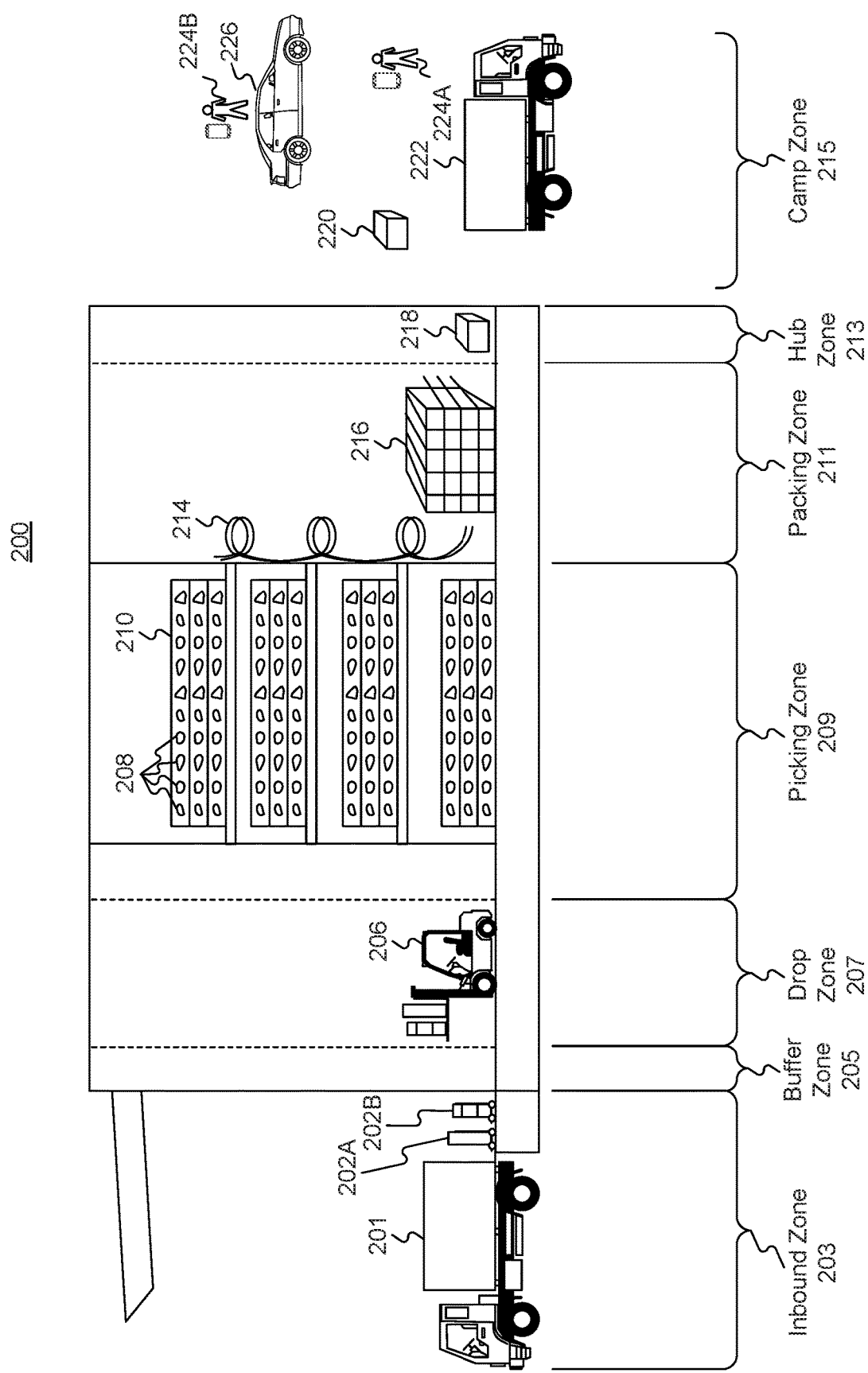
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
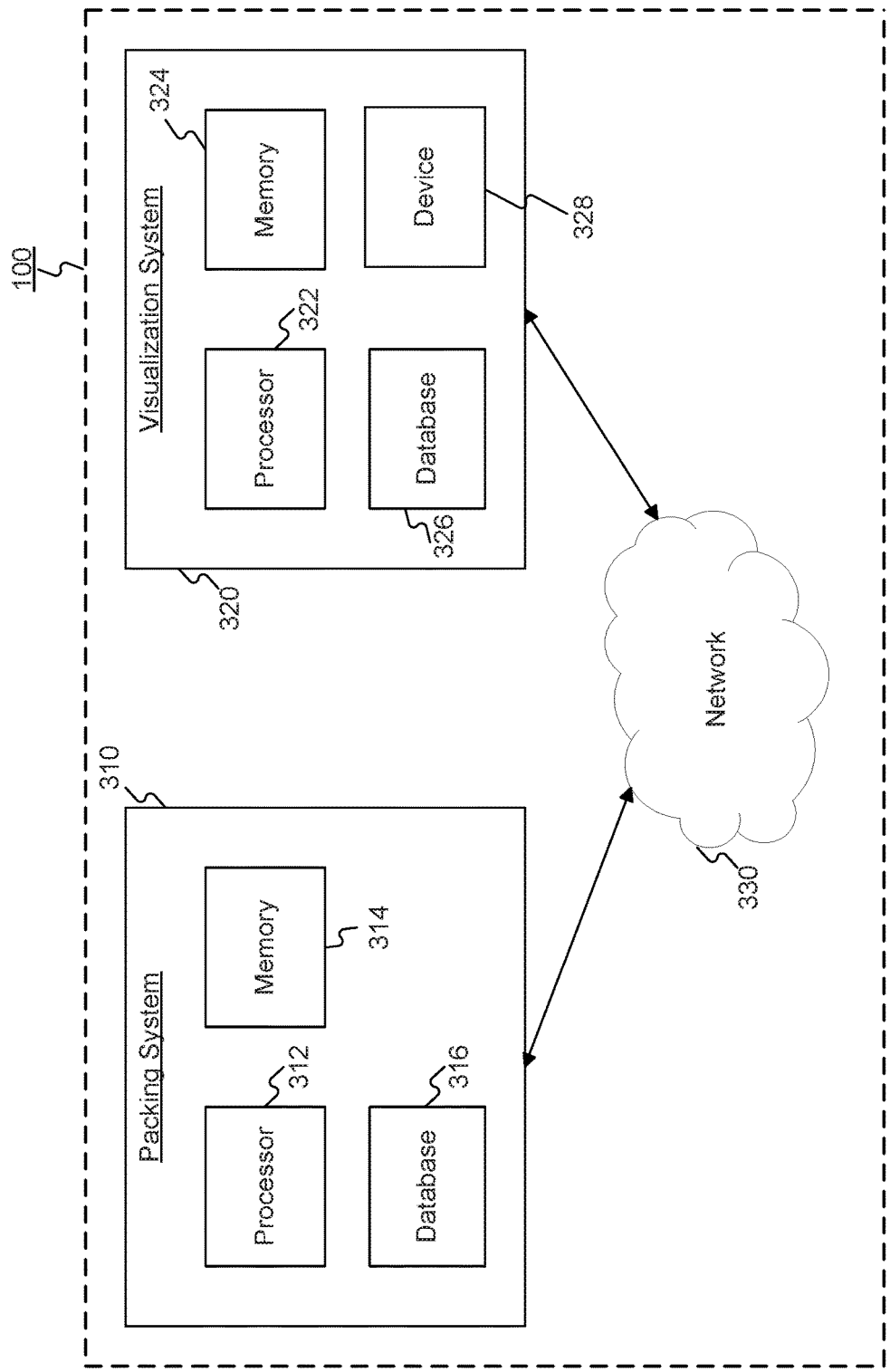
FIG. 3 is a schematic block diagram illustrating an exemplary embodiment of a network comprising computerized systems for efficient box packing and visualization, consistent with the disclosed embodiments.

Referring to FIG. 3, a schematic block diagram illustrating an exemplary embodiment of a network comprising computerized systems for efficient box packing and visualization is shown. As illustrated in FIG. 3, system 100 may include a packing system 310 that may communicate with a visualization system 320 via a network 330. Additionally, system 100 may include all components and processes as explained above for FIG. 1. In some embodiments, packing system 310 and visualization system 320 may communicate with other components of system 100 via network 330 or via a direct connection, for example using a cable. While in FIG. 3, packing system 310 and visualization system 320 are depicted as separate systems, in some embodiments, packing system 310 and visualization system 320 may be implemented as a single device or system.

As shown in FIG. 3, packing system 310 may comprise a processor 312, a memory 314, and a database 316. Processor 312 may be one or more known processing devices, such as a microprocessor from the Pentium™ family manufactured by Intel™ or the Turion™ family manufactured by AMD™. Processor 312 may constitute a single core or multiple core processor that executes parallel processes simultaneously. For example, processor 312 may use logical processors to simultaneously execute and control multiple processes. Processor 312 may implement virtual machine technologies or other known technologies to provide the ability to execute, control, run, manipulate, store, etc. multiple software processes, applications, programs, etc. In another example, processor 312 may include a multiple-core processor arrangement configured to provide parallel processing functionalities to allow packing system 310 to execute multiple processes simultaneously. One of ordinary skill in the art would understand that other types of processor arrangements could be implemented that provide for the capabilities disclosed herein.

Memory 314 may store one or more operating systems that perform known operating system functions when executed by processor 312. By way of example, the operating system may include Microsoft Windows, Unix, Linux, Android, Mac OS, iOS, or other types of operating systems. Accordingly, examples of the disclosed invention may operate and function with computer systems running any type of operating system. Memory 314 may be a volatile or non-volatile, magnetic, semiconductor, tape, optical, removable, non-removable, or other type of storage device or tangible computer readable medium.

Database 316 may include, for example, Oracle™ databases, Sybase™ databases, or other relational databases or non-relational databases, such as Hadoop™ sequence files, HBase™, or Cassandra™. Database 316 may include computing components (e.g., database management system, database server, etc.) configured to receive and process requests for data stored in memory devices of the database(s) and to provide data from the database(s). Database 316 may include NoSQL databases such as HBase, MongoDB™ or Cassandra™. Alternatively, database 316 may include relational databases such as Oracle, MySQL and Microsoft SQL Server. In some embodiments, database 316 may take the form of servers, general purpose computers, mainframe computers, or any combination of these components.

Database 316 may store data that may be used by processor 312 for performing methods and processes associated with disclosed examples. Database 316 may be located in packing system 310 as shown in FIG. 3, or alternatively, it may be in an external storage device located outside of packing system 310. Data stored in 316 may include any suitable data associated with packing boxes (e.g., data structures of different available packing boxes, package identifier, etc.).

Packing system 310, in some embodiments, may be implemented as a computer system that generates instructions for efficient box packing using the product information of items in an order and package information for packing boxes. Packing system 310 may comprise a single computer or may be configured as a distributed computer system including multiple computers that interoperate to perform one or more of the processes and functionalities associated with the disclosed examples. In some embodiments, packing system 310 may receive a customer's order comprising at least one item from a remote system (e.g., external front end system 103).

Packing system 310 may search at least one data store (e.g., a database of FO system 113) to determine dimensions associated with each item of the order. For example, FO system 113 may store information (e.g., length, volume, weight, fragileness, product identifier, etc.) associated with each item. Packing system 310 may then retrieve the information associated with each item from FO system 113 via network 330. Packing system 310 may determine the largest item of each order based on the determined dimensions retrieved from FO system 113. The largest item may be determined by sorting the items of the orders by longest length or by largest volume (i.e., the mathematical product of length, width, and height of the item).

The product information retrieved from FO system 113 may include a tag associated with each item. The tag associated with each item indicates a degree of fragileness for that item and, accordingly, the amount of packing bubble needed to package that item. For example, a pillow may be tagged as "normal," which indicates a fragileness factor of 1.1 while a glass cup may be tagged as "fragile," which indicates a fragileness factor of 1.3. (Other factors are possible; these factors are intended only as exemplary values.) A "normal" tag indicates that the associated item requires less room in the package for packing bubble and a "fragile" tag indicates that the associated item requires more room in the package for packing bubble. Packing system 310 may modify dimensions of at least one largest item of the order using a tag associated with the at least one largest item. For example, packing system 310 may multiply each of the length, width, and height of the item by the fragileness factor for that item, resulting in a modified item. Upon receiving the order and retrieving the product information for each item of the order, packing system 310 may select a data structure representing a packing box ("package") from database 316, where the data structure comprises a size (i.e., length, width, height, volume) of the package. Packing system 310 may select the data structure based on the dimensions and tag associated with each item of the order. That is, the data structure may be selected so that at least one item fits in the data structure.

Packing system 310 may simulate packing the modified largest item into a package and calculate a plurality of remaining spaces in the package by subtracting the dimensions of the modified largest item from the dimensions of the package. Simulation of packing the modified largest item may include repeatedly modifying the first orientation of the item (i.e., rotating the item) until the optimal orientation of the item is determined. For example, packing system 310 may rotate the item in six different directions (i.e., orient the rectangular prism-shaped item in the direction of each of its six faces) until it fits in the package and is positioned in the corner of the package adjacent to the length of the package. Packing system 310 may store the orientation data for each rotation of the item in database 316. The orientation data may include the coordinate point of each of the eight corners of the item after each rotation. Packing system 310 may instantiate at least one data structure corresponding to the calculated remaining spaces in the package, where each data structure comprises a size of an associated calculated remaining space. Packing system 310 may instantiate data structures of various combinations of the calculated remaining spaces to determine the most efficient packing arrangement of the items in the package. For example, the remaining spaces may be represented by two larger rectangular prisms or by three smaller rectangular prisms depending on how the remaining spaces are divided. Packing system 310 may determine the center point in a three-dimensional system (e.g., 0,0,0 within an X, Y, Z coordinate system in a data structure) for each data structure corresponding to the calculated remaining spaces in the package in order to determine the optimal packing arrangement for each item. For example, packing system 310 may determine the center point of each space after each iteration.

Packing system 310 may iteratively simulate packing the remaining items from the order into the remaining spaces of the package based on the size of the remaining items modified by their respective fragileness factors. Packing system 310 may simulate all possible combinations of packing (e.g., sequence of items placed in package, iteratively sorting the items from longest to shortest length, iteratively sorting the items from largest to smallest volume, etc.) and store each possible combination in database 316. The iterative simulation may include rotating and storing the orientation data of each item, as explained above. Packing system 310 may choose a larger package if, at any iteration, an item does not fit in the selected package. Packing system 310 may iteratively simulate packing each item of the order until all items are packed in the package.

Packing system 310 may choose the most efficient box packing arrangement based on the various calculated combinations and generate at least one set of instructions for packing the items into the selected package. For example, packing system 310 may generate a first list of package arrangements for packing the items by largest volume and a second list of package arrangements for packing the items by largest side (i.e., longest single dimension). Packing system 310 may select one of the first list or the second list and generate the instructions for packing based on the selected list.

Packing system 310 may select the list for instruction generation based on a customer's selection of one of a smaller number of packages used for delivery, a lower cost, or a higher fill rate (i.e., highest percentage of each package being filled). Packing system 310 may send the generated instructions to visualization system 320 for display, where the instructions include at least one item identifier and one package identifier.

As shown in FIG. 3, visualization system 320 may comprise a processor 322, a memory 324, a database 326, and a device 328. Similar to processor 312 described above, processor 322 may be one or more known processing devices, such as a microprocessor from the Pentium™ family manufactured by Intel™ or the Turion™ family manufactured by AMD™. Processor 322 may constitute a single core or multiple core processor that executes parallel processes simultaneously. For example, processor 322 may use logical processors to simultaneously execute and control multiple processes. Processor 322 may implement virtual machine technologies or other known technologies to provide the ability to execute, control, run, manipulate, store, etc. multiple software processes, applications, programs, etc. In another example, processor 322 may include a multiple-core processor arrangement configured to provide parallel processing functionalities to allow visualization system 320 to execute multiple processes simultaneously. One of ordinary skill in the art would understand that other types of processor arrangements could be implemented that provide for the capabilities disclosed herein.

Similar to memory 314 described above, memory 324 may store one or more operating systems that perform known operating system functions when executed by processor 322. By way of example, the operating system may include Microsoft Windows, Unix, Linux, Android, Mac OS, iOS, or other types of operating systems. Accordingly, examples of the disclosed invention may operate and function with computer systems running any type of operating system. Memory 324 may be a volatile or non-volatile, magnetic, semiconductor, tape, optical, removable, non-removable, or other type of storage device or tangible computer readable medium.

Similar to database 316 described above, database 326 may include, for example, Oracle™ databases, Sybase™ databases, or other relational databases or non-relational databases, such as Hadoop™ sequence files, HBase™, or Cassandra™ Database 326 may include computing components (e.g., database management system, database server, etc.) configured to receive and process requests for data stored in memory devices of the database(s) and to provide data from the database(s). Database 316 may include NoSQL databases such as HBase, MongoDB™ or Cassandra™. Alternatively, database 326 may include relational databases such as Oracle, MySQL and Microsoft SQL Server. In some embodiments, database 326 may take the form of servers, general purpose computers, mainframe computers, or any combination of these components.

Database 326 may store data that may be used by processor 322 for performing methods and processes associated with disclosed examples. Database 326 may be located in visualization system 320 as shown in FIG. 3, or alternatively, it may be in an external storage device located outside of packing system 320. Data stored in 316 may include any suitable data associated with packing boxes (e.g., data received from packing system 310, visual displays of previous packing arrangements and instructions, etc.).

Device 328 may be a tablet, mobile device, computer, or the like. Device 328 may include a display. The display may include, for example, liquid crystal displays (LCD), light emitting diode screens (LED), organic light emitting diode screens (OLED), a touch screen, and other known display devices. The display may show various information to a user. For example, it may display visual packing arrangements according to the generated instructions provided by packing system 310. Device 328 may include one or more input/output (I/O) devices (i.e., a user interface). The I/O devices may include one or more devices that allow device 328 to send and receive information from another device. The I/O devices may also include one or more communication modules (not shown) for sending and receiving information from visualization system 320 by, for example, establishing wired or wireless connectivity between device 328 and network 330.

Visualization system 320, in some embodiments, may be implemented as a computer system that displays packing arrangements according to instructions for efficient box packing received from packing system 310. Visualization system 320 may comprise a single computer or may be configured as a distributed computer system including multiple computers that interoperate to perform one or more of the processes and functionalities associated with the disclosed examples. In some embodiments, visualization system may simultaneously display the instructions received from packing system 310 and an animated tutorial according to the received instructions on device 328. The instructions may include instructions for placement of each item to be packed, an order of placement (i.e., sequence) for each item to be packed, or a computer-generated image depicting each item to be packed. For example, device 328 may display text of the instructions. In another example, device 328 may display a rectangular prism that represents the package and a smaller rectangular prism that represents an item. Device 328 may further display the rectangular prism representing the item rotating in different directions before settling into the position within the package associated with the received instructions.

Figure 4:
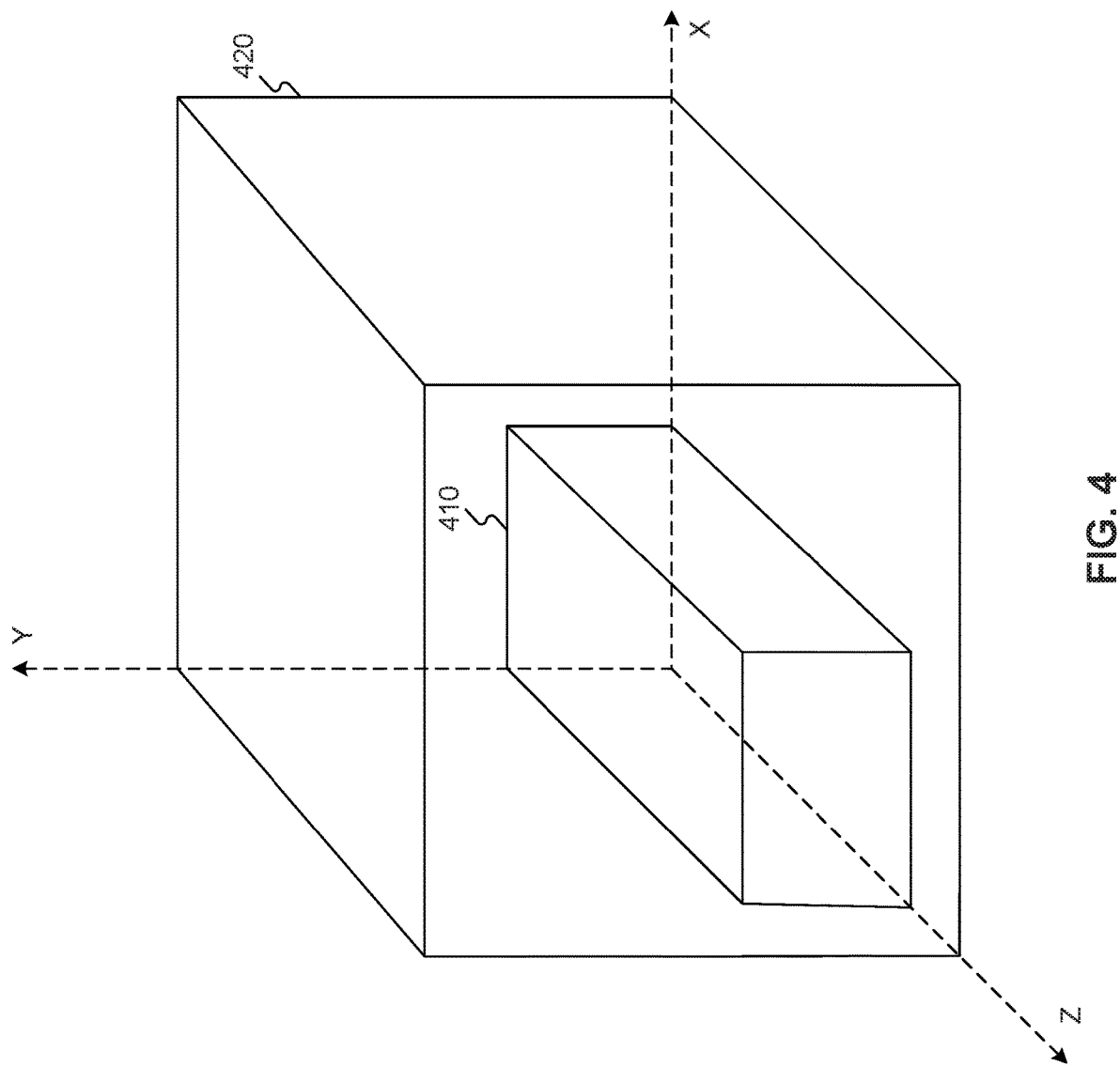
FIG. 4 depicts an exemplary visualization of an item in a packing box, consistent with the disclosed embodiments.

Referring to FIG. 4, an exemplary visualization of an item in a packing box is shown. As illustrated in FIG. 4, visualization system 320 may display on device 328 a modified item 410 in a package 420 in a three-dimensional coordinate system (i.e., X, Y, Z). Modified item 410 may represent a largest item in an order, including an associated fragileness factor to account for the packing bubble.

Figure 5:
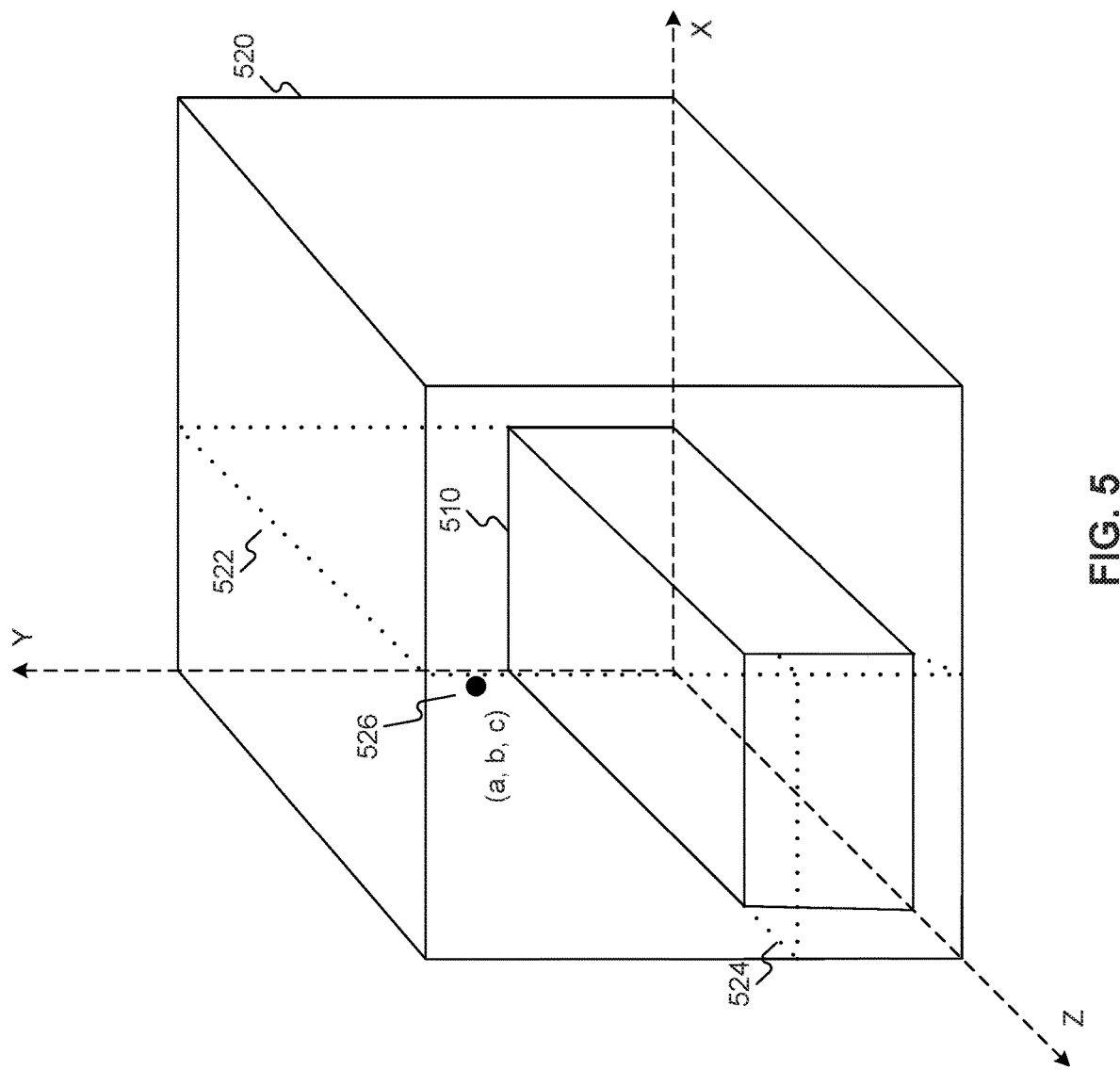
FIG. 5 depicts an exemplary visualization of an item in a packing box, consistent with the disclosed embodiments.

Referring to FIG. 5, an exemplary visualization of an item in a packing box is shown. As illustrated in FIG. 5, visualization system 320 may display on device 328 a modified item 510 in a package 520 in a three-dimensional coordinate system (i.e., X, Y, Z), similar to FIG. 4 as explained above. Modified item 510 may represent a largest item in an order, including an associated fragileness factor to account for the packing bubble. FIG. 5 also includes dividers 522 and 524, which demonstrate the calculated remaining space as rectangular prisms. Dividers 522 and 524 are depicted for illustrative purposes and are not necessarily intended to represent physical structures. For example, dividers 522 and 524 show three remaining spaces in FIG. 5. A center point 526 of one of the remaining spaces is depicted as a point (a, b, c). Although the center point of each remaining space is not shown, the center point may be determined for each remaining space in all of the disclosed embodiments herein.

Figure 6:
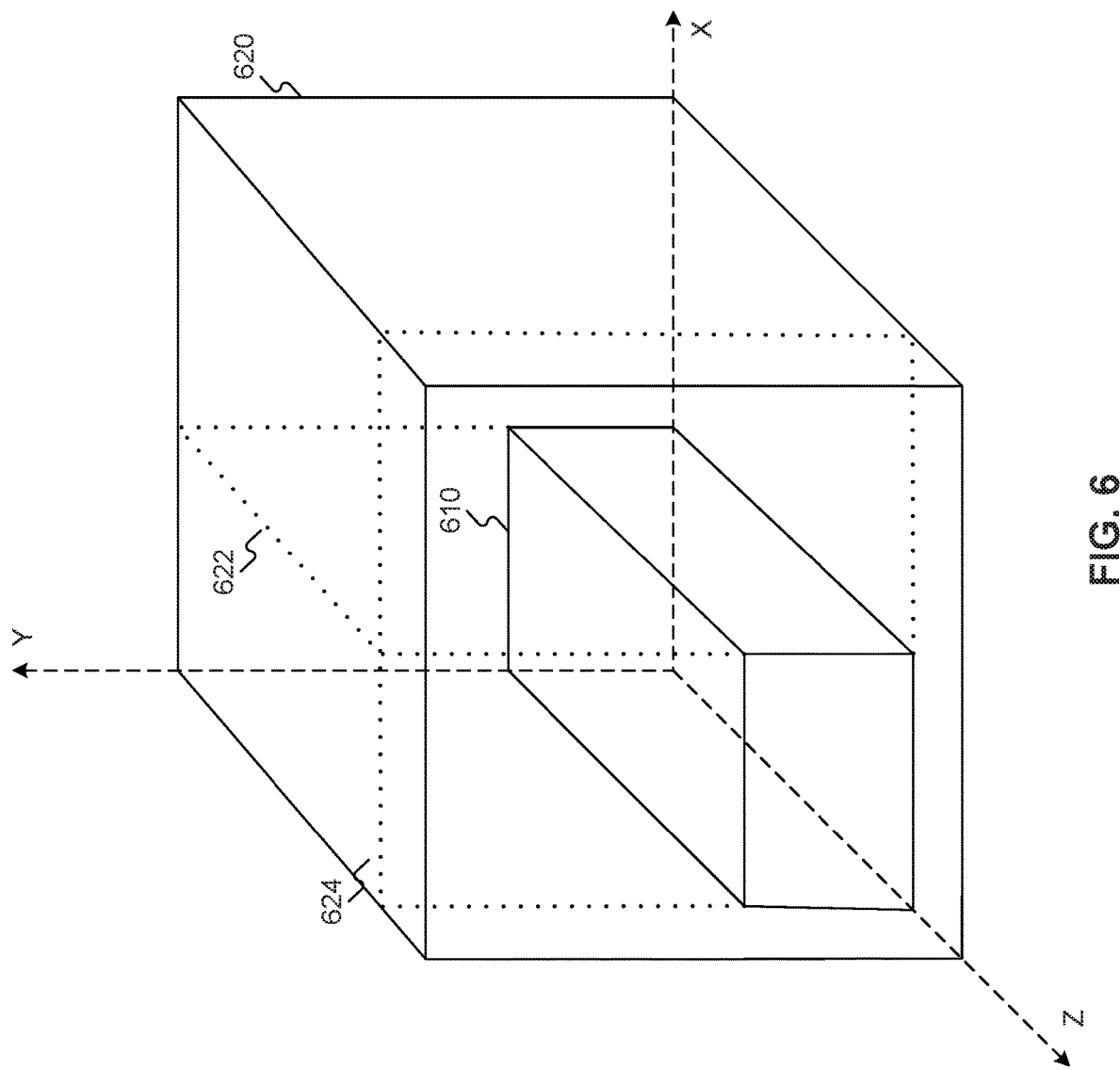
FIG. 6 depicts an exemplary visualization of an item in a packing box, consistent with the disclosed embodiments.

Referring to FIG. 6, an exemplary visualization of an item in a packing box is shown. As illustrated in FIG. 6, visualization system 320 may display on device 328 a modified item 610 in a package 620 in a three-dimensional coordinate system (i.e., X, Y, Z), similar to FIGS. 4 and 5 as explained above. Modified item 610 may represent a largest item in an order, including an associated fragileness factor to account for the packing bubble. FIG. 6 also includes dividers 622 and 624, which demonstrate the calculated remaining space as rectangular prisms. Dividers 622 and 624 are depicted for illustrative purposes and are not, in all embodiments, implemented as physical structures. For example, FIG. 6 shows three remaining spaces having sizes different from those of FIG. 5.

Figure 7:
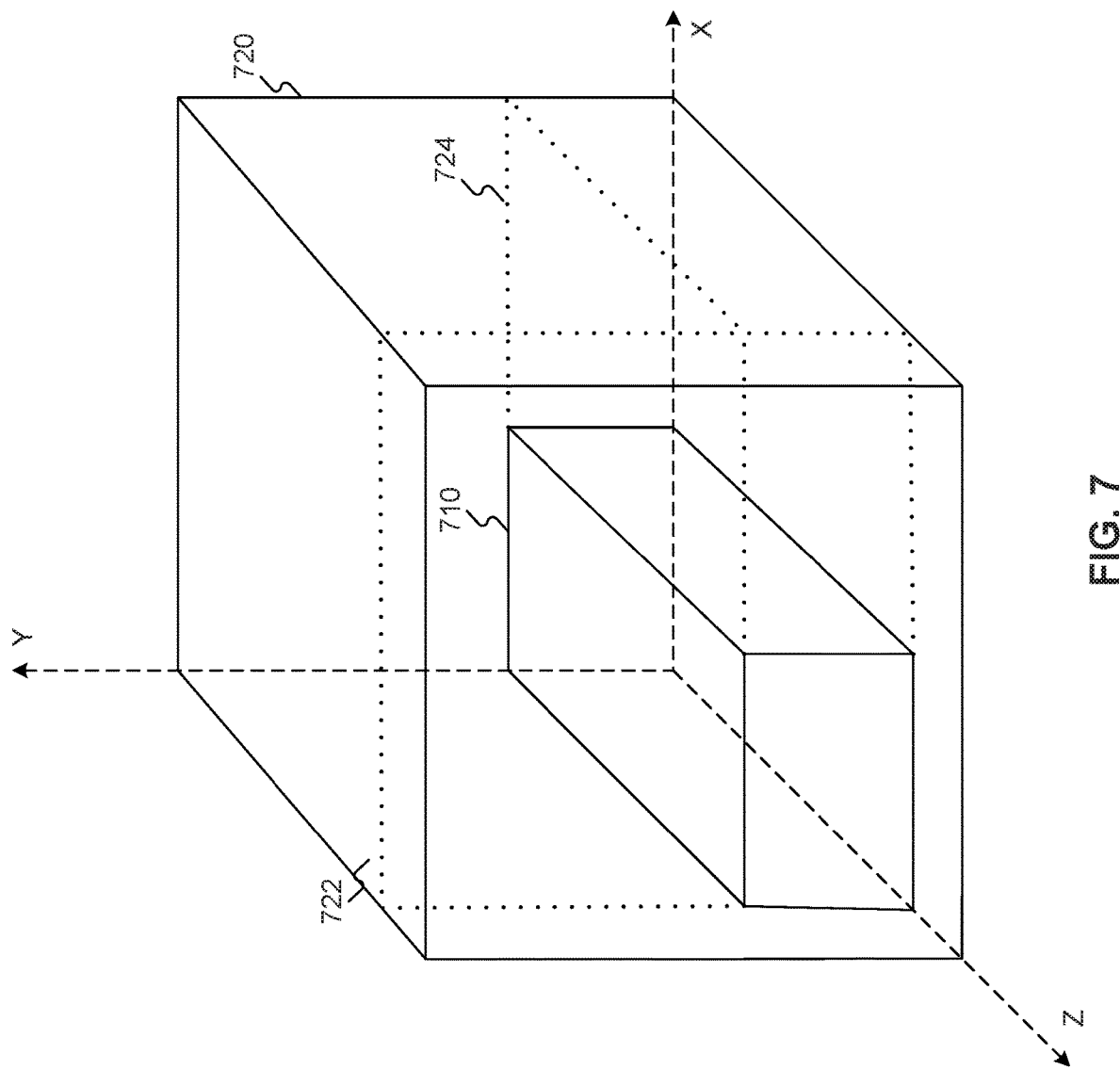
FIG. 7 depicts an exemplary visualization of an item in a packing box, consistent with the disclosed embodiments.

Referring to FIG. 7, an exemplary visualization of an item in a packing box is shown. As illustrated in FIG. 7, visualization system 320 may display on device 328 a modified item 710 in a package 720 in a three-dimensional coordinate system (i.e., X, Y, Z), similar to FIGS. 4-6 as explained above. Modified item 710 may represent a largest item in an order, including an associated fragileness factor to account for the packing bubble. FIG. 7 also includes dividers 722 and 724, which demonstrate the calculated remaining space as rectangular prisms. Dividers 722 and 724 are depicted for illustrative purposes and are not, in all embodiments, implemented as physical structures. For example, FIG. 7 shows three remaining spaces having sizes different from those of FIG. 5 or 6.

Figure 8:
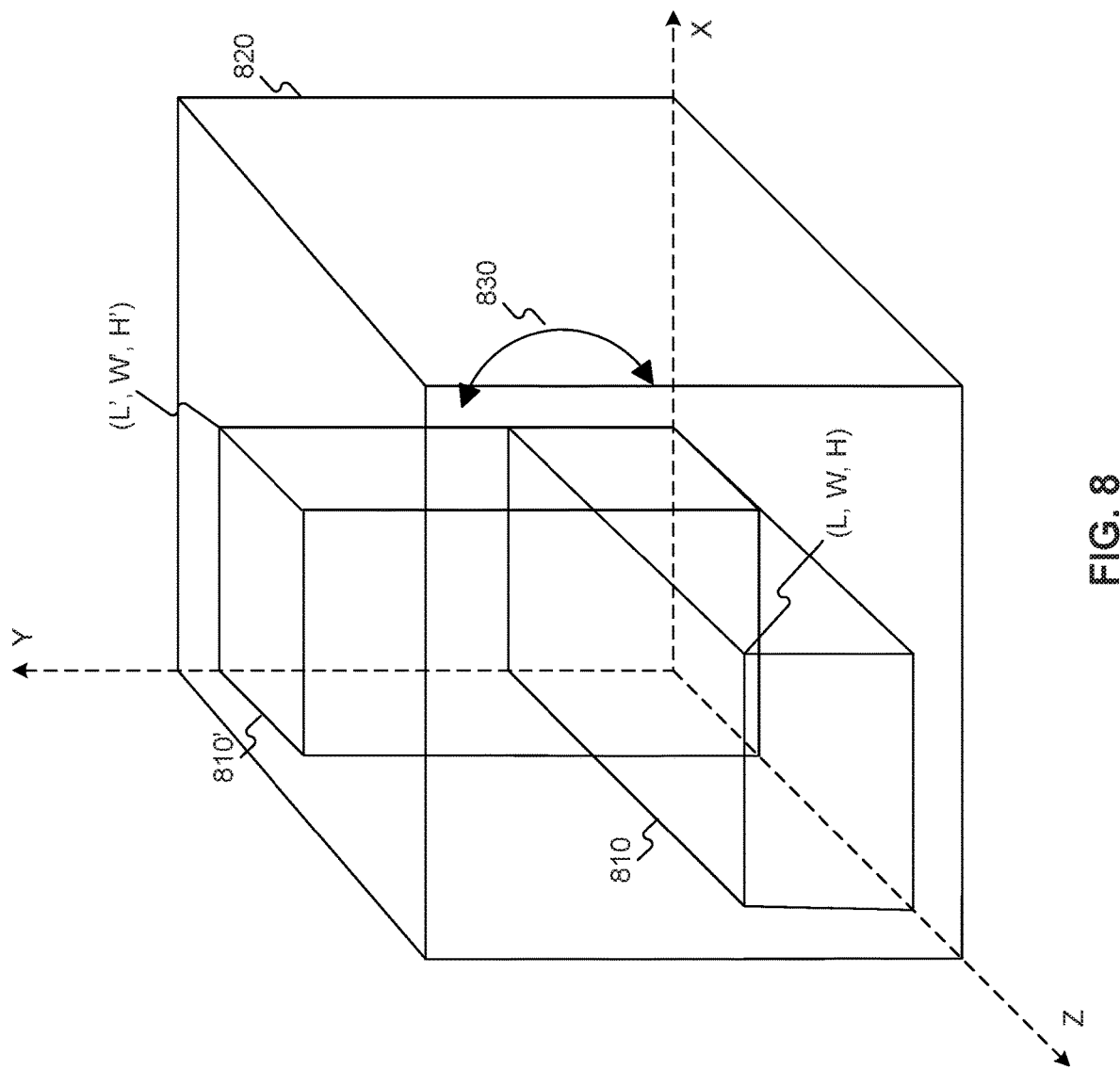
FIG. 8 depicts an exemplary visualization of an item rotated in a packing box, consistent with the disclosed embodiments.

Referring to FIG. 8, an exemplary visualization of an item rotated in a packing box is shown. As illustrated in FIG. 8, a visualization system 320 may display on device 328 a modified item 810 in a package 820 in a three-dimensional coordinate system (i.e., X, Y, Z), similar to FIGS. 4-7 as explained above. Modified item 810 may represent a largest item in an order, including an associated fragileness factor to account for the packing bubble. Packing system 310 may store the orientation data for each modified item 810, including the orientation data for modified item 810 after each rotation. The orientation data may include the coordinate point of each of the eight corners of modified item 810. Although a coordinate point (L, W, H) of modified item 810 is depicted for one corner of modified item 810, it is noted that a coordinate point of each of the eight corners of modified item 810 is recorded to determine the optimal orientation of modified item 810 within package 820. Although a rotated modified item 810' is depicted in one direction (i.e., one face) of modified item 810, it is noted that modified item 810 may be rotated in each of six directions. Similarly, a coordinate point (L', W', H') of rotated modified item 810' is depicted for one corner of rotated modified item 810', but a coordinate point of each of the eight corners of rotated modified item 810' is recorded to determine the optimal orientation of modified item 810 within package 820.

Figure 9:
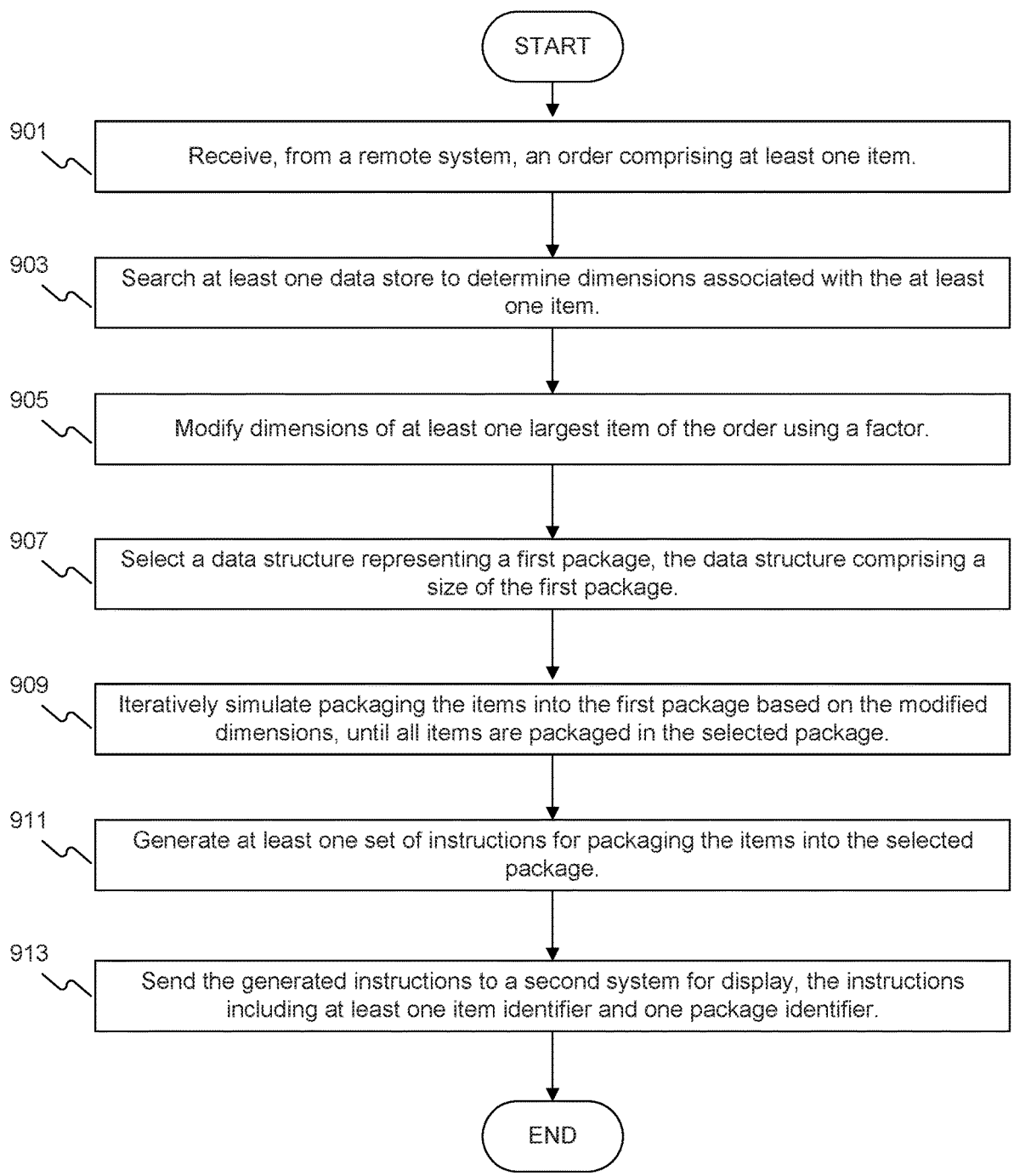
FIG. 9 depicts a process for generating instructions for efficient box packing, consistent with the disclosed embodiments.

Referring to FIG. 9, a process 900 for generating instructions for efficient box packing is shown.

In step 901, packing system 310 receives, from a remote system (e.g., external front end system 103), an order comprising at least one item. The order may be submitted to the remote system by a customer and the remote system may assign an order identifier to the submitted order.

In step 903, packing system 310 receives the order identifier and searches at least one data store (e.g., FO system 113) for product information associated with the at least one item of the order to determine dimensions associated with the at least one item of the order. The product information may include a tag of each item and the dimensions of each item. The tag associated with each item may indicate a degree of fragileness for that item which, in some embodiments, represents the amount of packing bubbles, or other packing material, extra space, or the like needed to package that item. The dimensions associated with each item may include the height, width, length, or weight of each item.

In step 905, packing system 310 modifies the dimensions of at least one largest item of the order using a factor. Packing system 310 may determine the largest item by sorting the items of the order by largest volume or longest length. The factor may be a fragileness factor to account for the amount of packing bubble to be used in the package. An item tagged as "normal" may have a fragileness factor of 1.1 whereas an item tagged as "fragile" may have a fragileness factor of 1.3. The dimensions of at least one largest item may be modified by multiplying the volume of the item by its associated fragileness factor.

In step 907, packing system 310 selects a data structure representing a first package. Packing system 310 may select a data structure representing a package from database 316 based on the dimensions and tag associated with each item of the order. That is, the data structure may be selected so that at least one item fits in the data structure and so that the customer's selection of one of a smaller number of packages, a lower cost, or a higher fill rate is met. The data structure may include a size (e.g., length, width, height, volume, etc.) of the first package.

In step 909, packing system 310 may iteratively simulate packing the items into the first package based on the modified dimensions until all items are packed in the selected package. The iterative simulation may include calculating a plurality of remaining spaces in the package by subtracting the dimensions of the modified largest item from the dimensions of the package. Packing system 310 may iteratively simulate packing the remaining items from the order into the remaining spaces of the package based on the size of the remaining items modified by their respective fragileness factors. Simulation of packing the modified largest item may include repeatedly modifying the first orientation of the item until the optimal orientation of the item is determined. For example, packing system 310 may rotate the item in six different directions until it fits in the package and is positioned in the corner of the package adjacent to the length of the package. Packing system 310 may store the orientation data for each rotation of the item in database 316. The orientation data may include the coordinate point of each of the eight corners of the item after each rotation. Packing system 310 may instantiate at least one data structure corresponding to the calculated remaining spaces in the package, where each data structure comprises a size of an associated calculated remaining space. Packing system 310 may instantiate data structures of various combinations of the calculated remaining spaces to determine the most efficient packing arrangement of the items in the package. For example, the remaining spaces may be represented by two larger rectangular prisms or by three smaller rectangular prisms depending on how the remaining spaces are divided. Packing system 310 may determine the center point in a three-dimensional system (e.g., 0,0,0 within an X, Y, Z coordinate system in a data structure) for each data structure corresponding to the calculated remaining spaces in the package in order to determine the optimal packing arrangement for each item. For example, packing system 310 may determine the center point of each space after each iteration.

Packing system 310 may iteratively simulate packing the remaining items from the order into the remaining spaces of the package based on the size of the remaining items modified by their respective fragileness factors. Packing system 310 may simulate all possible combinations of packing (e.g., sequence of items placed in package, iteratively sorting the items from longest to shortest length, iteratively sorting the items from largest to smallest volume, etc.) and store each possible combination in database 316. The iterative simulation may include rotating and storing the orientation data of each item, as explained above. Packing system 310 may choose a larger package if, at any iteration, an item does not fit in the selected package. Packing system 310 may iteratively simulate packing each item of the order until all items are packed in the package.

In step 911, packing system 310 generates at least one set of instructions for packing the items into the selected package. The instructions may include the most efficient box packing arrangement and order of item placement into the package. The instructions may be generated based on the customer's selection of one of a smaller number of packages used for delivery, a lower cost, or a higher fill rate. For example, packing system 310 may generate a first list of package arrangements for packing the items by largest volume and a second list of package arrangements for packing the items by largest side. Packing system 310 may select one of the first list or the second list and generate the instructions for packing based on the selected list.

Packing system 310 may select the list for instruction generation based on a customer's selection of one of a smaller number of packages used for delivery, a lower cost, or a higher fill rate (i.e., highest percentage of each package being filled).

In step 913, packing system 310 sends the generated instructions to visualization system 320 for display, where the instructions include at least one item identifier and one package identifier. Visualization system 320 may display packing arrangements and order of item placement based on the instructions received from packing system 310. Visualization system may simultaneously display the instructions and an animated tutorial according to the received instructions.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for automatic packing determination, comprising:
   at least one processor; and
   at least one non-transitory storage medium comprising instructions that, when executed by the at least one processor, cause the at least one processor to perform steps comprising:
      receiving, from a remote system, an order comprising at least one item;
      searching at least one data store to determine dimensions associated with the at least one item and to determine a tag associated with each of the at least one item;
         wherein each tag is associated with a fragileness factor and the fragileness factor is determined based on a length, volume, or weight of the at least one item;
      modifying dimensions of at least one largest item of the order using the factor;
      selecting a data structure representing a first package, the data structure comprising a size of the first package;
      iteratively simulating packing the items into the first package based on the modified dimensions, until all items are packed in the selected package;
      generating at least one set of instructions for packing the items into the selected package; and
      sending the generated instructions to a second system for display, the instructions including at least one item identifier associated with the at least one item and one package identifier associated with the first package, wherein the generated instructions are configured to cause the second system to display instructions for placement of each item to be packed on a user interface.

2. The system of claim 1, wherein iteratively simulating packing further comprises:
   determining dimensions of each item of the order;
   determining the largest item of each item in the order based on the determined dimensions;
   simulating packing the largest item into the first package;
   calculating a plurality of remaining spaces in the first package by subtracting the dimensions of the largest item from the dimensions of the first package;
   instantiating at least one data structure corresponding to the calculated remaining spaces, each data structure comprising a size of an associated calculated remaining space; and
   iteratively simulating packing at least one remaining item in the group into at least one of the calculated remaining spaces.

3. The system of claim 2, wherein
   iteratively simulating packing further comprises:
      selecting a first largest-volume item by determining an item with the largest volume, where volume is calculated by multiplying a length of each item, a width of each item, and a height of each item;
      iteratively simulating packing the first largest-volume item into a package;
      selecting a next largest-volume item by determining an item with the second largest volume;
      repeatedly simulating packing the next largest-volume item into the package until all items are packed; and
      generating a first list of packages for packing by largest volume;
      selecting a first largest-side item by determining an item with a longest single dimension;
      iteratively simulating packing the first largest-side item into a package;
      selecting a next largest-side item by determining an item with a second-longest single dimension;
      repeatedly simulating packing the next largest-side item into the package until all items are packed; and
      generating a second list of packages for packing by largest volume; and
   wherein generating the at least one set of instructions comprises:
      selecting one of the first list or the second list; and
      generating the instructions based on the selected list.

4. The system of claim 3, wherein selecting one of the first list or the second list comprises selecting a list requiring:
   a smaller number of packages,
   a lower cost, or
   a higher fill rate.

5. The system of claim 1, wherein iteratively simulating packing the largest item into the first package further comprises:
   determining dimensions of each item of the order;
   determining the largest item of each item in the order based on the determined dimensions;
   simulating packing each item into the first package using a first orientation for each item;
   determining a fill rate for the first package based on packing each item into the first package using the first orientation;
   repeatedly modifying the first orientation for each item and determining a fill rate for the first package by simulating packing each item using at least one modified first orientation; and
   selecting a set of orientations for the items based on maximization of fill rate.

6. The system of claim 1, wherein:
   the fragileness factor is selected from normal or fragile; and
   each of the normal and fragile fragileness factors comprises at least one value, the factor for the normal tag being smaller than the factor for the fragile tag.

7. The system of claim 6, wherein modifying dimensions of an item using the factor further comprises:
   determining another tag associated with an item; determining another factor associated with the another tag; and modifying the dimensions of the item based on the determined another factor.

8. The system of claim 1, wherein if the simulating determines that the at least one item does not fit into the selected package:
   choosing a larger package, and
   iteratively simulating packing each item until all items are packed in the larger package.

9. The system of claim 1, wherein the generated instructions are configured to cause the second system to display information on a user interface and further comprise:
   an order of placement for each item to be packed; or
   a computer-generated image depicting each item to be packed.

10. A method for generating packing instructions, comprising:

receiving, from a remote system, an order comprising at least one item;

searching at least one data store to determine dimensions associated with the at least one item and to determine a tag associated with each of the at least one item;

wherein each tag is associated with a fragileness factor and the fragileness factor is determined based on a length, volume, or weight of the at least one item;

modifying dimensions of at least one largest item of the order using the factor;

selecting a data structure representing a first package, the data structure comprising a size of the first package;

iteratively simulating packing the items into the first package based on the modified dimensions, until all items are packed in the selected package;

generating at least one set of instructions for packing the items into the selected package; and sending the generated instructions to a second system for display, the instructions including at least one item identifier associated with the at least one item and one package identifier associated with the first package, wherein the generated instructions are configured to cause the second system to display instructions for placement of each item to be packed on a user interface.

11. The system of claim 10, wherein iteratively simulating packing further comprises:
  determining dimensions of each item of the order;
  determining the largest item of each item in the order based on the determined dimensions;
  simulating packing the largest item into the first package;
  calculating a plurality of remaining spaces in the first package by subtracting the dimensions of the largest item from the dimensions of the first package;
  instantiating at least one data structure corresponding to the calculated remaining spaces, each data structure comprising a size of an associated calculated remaining space; and
  iteratively simulating packing at least one remaining item in the group into at least one of the calculated remaining spaces.

12. The method of claim 11, wherein iteratively simulating packing further comprises:
  selecting a first largest-volume item by determining an item with the largest volume, where volume is calculated by multiplying a length of each item, a width of each item, and a height of each item;
  iteratively simulating packing the first largest-volume item into a package;
  selecting a next largest-volume item by determining an item with the second largest volume;
  repeatedly simulating packing the next largest-volume item into the package until all items are packed; and
  generating a first list of packages for packing by largest volume;
  selecting a first largest-side item by determining an item with a longest single dimension;
  iteratively simulating packing the first largest-side item into a package;
  selecting a next largest-side item by determining an item with a second-longest single dimension;
  repeatedly simulating packing the next largest-side item into the package until all items are packed; and
  generating a second list of packages for packing by largest volume; and wherein generating the at least one set of instructions comprises:
  selecting one of the first list or the second list; and
  generating the instructions based on the selected list.

13. The method of claim 12, wherein selecting one of the first list or the second list comprises selecting a list requiring:
  a smaller number of packages,
  a lower cost, or
  a higher fill rate.

14. The method of claim 10, wherein iteratively simulating packing the largest item into the first package further comprises:
  determining dimensions of each item of the order;
  determining the largest item of each item in the order based on the determined dimensions;
  simulating packing each item into the first package using a first orientation for each item;
  determining a fill rate for the first package based on packing each item into the first package using the first orientation;
  repeatedly modifying the first orientation for each item and determining a fill rate for the first package by simulating packing each item using at least one modified first orientation; and
  selecting a set of orientations for the items based on maximization of fill rate.

15. The method of claim 10, wherein:
  the fragileness factor is selected from normal or fragile; and
  each of the normal and fragile fragileness factors comprises at least one value, the factor for the normal tag being smaller than the factor for the fragile tag.

16. The method of claim 15, wherein modifying dimensions of an item using the factor further comprises:
  determining another tag associated with an item; determining another factor associated with the another tag; and modifying the dimensions of the item based on the determined another factor.

17. The method of claim 10, wherein if the simulating determines that the at least one item does not fit into the selected package:
  choosing a larger package, and
  iteratively simulating packing each item until all items are packed in the larger package.

18. The method of claim 10, wherein the generated instructions are configured to cause the second system to display information on a user interface and further comprise:
  an order of placement for each item to be packed; or
  a computer-generated image depicting each item to be packed.

19. A computerized system for automatic packing determination, comprising:
  at least one processor; and
  at least one non-transitory storage medium comprising instructions that, when executed by the at least one processor, cause the at least one processor to perform steps comprising:
    receiving, from a remote system, an order comprising at least one item;
    searching at least one data store to determine dimensions associated with the at least one item and to determine a tag associated with each of the at least one item;

wherein each tag is associated with a fragileness factor and the fragileness factor is determined based on a length, volume, or weight of the at least one item:

modifying dimensions of at least one largest item of the order using the factor;

selecting a data structure representing a first package, the data structure comprising a size of the first package;

iteratively simulating packing the items into the first package based on the modified dimensions, until all items are packed in the selected package;

generating at least one set of instructions for packing the items into the selected package;

sending the generated instructions to a second system for display, the instructions including at least one item identifier associated with the at least one item and one package identifier associated with the first package, wherein the generated instructions are configured to cause the second system to display instructions for placement of each item to be packed on a user interface;

wherein the generated instructions include:
  instructions for placement of each item to be packed;
  an order of placement for each item to be packed; and
  a computer-generated image depicting each item to be packed.

20. The system of claim 19, wherein iteratively simulating packing further comprises:

simulating packing the largest item into the first package;

calculating a plurality of remaining spaces in the first package by subtracting the dimensions of the largest item from the dimensions of the first package;

instantiating at least one data structure corresponding to the calculated remaining spaces, each data structure comprising a size of an associated calculated remaining space; and iteratively simulating packing at least one remaining item in the group into at least one of the calculated remaining spaces.

* * * * *